US006249401B1

(12) United States Patent
Zwettler

(10) Patent No.: US 6,249,401 B1
(45) Date of Patent: Jun. 19, 2001

(54) BELT-DRIVEN DATA CARTRIDGE WITH YOKE MECHANISM

(75) Inventor: Christopher J. Zwettler, Lake Elmo, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/433,685

(22) Filed: Nov. 4, 1999

(51) Int. Cl.[7] .................................................. G11B 23/087
(52) U.S. Cl. ........................................ 360/132; 242/352.4
(58) Field of Search ........................... 360/132; 242/352.4

(56) References Cited

U.S. PATENT DOCUMENTS

| 3,692,255 | 9/1972 | Von Behren . | |
|---|---|---|---|
| 4,678,137 | * 7/1987 | Kincheloe | 360/132 |
| 4,720,202 | * 1/1988 | Kawkami | 400/208 |
| 5,573,195 | 11/1996 | Runyan et al. . | |
| 5,779,172 | 7/1998 | Anderson et al. . | |

FOREIGN PATENT DOCUMENTS 0 466 608 A1   1/1992   (EP) .

OTHER PUBLICATIONS

"Mechanical Design of a Belt–Driven Data Cartridge," *Adv. Info. Storage Syst.*, von Behren et al., vol. 1, 1991, pp. 49–59.

* cited by examiner

Primary Examiner—Robert S. Tupper
(74) Attorney, Agent, or Firm—Eric D. Levinson

(57) ABSTRACT

A data cartridge (10) includes a yoke (30) on which the tape packs are mounted around hubs (46 and 47). Idler rollers (44 and 45) are also mounted on the yoke (30). The yoke (30) has a slot (40) through which a fixed pin (41) is positioned. The fixed pin (41) is connected to the housing (11) of the cartridge (10). The yoke has a spring (43) has one end attached to the yoke (33), connecting pin (42) and the second end is connected to the fixed pin (41). Therefore the yoke (30) is urged by the spring tension in a direction toward the hubs (46 and 47). The yoke (30) is free to move in two degrees of freedom as the tape packs move from one hub (46) to the other hub (47).

16 Claims, 3 Drawing Sheets

BELT-DRIVEN DATA CARTRIDGE WITH YOKE MECHANISM

BACKGROUND OF THE INVENTION

1. Field of the Invention

The present invention relates to belt-driven data storage cartridges, and in particular to a belt-driven data cartridge having a yoke mechanism which moves relative to a base plate.

2. Description of the Prior Art

Tape data cartridges have been used for decades in the computer, audio and visual fields. The cartridges themselves come in a large variety of sizes and types. One example of a successful belt-driven data cartridge is shown in U.S. Pat. No. 3,692,255 to von Behren. In that reference, a tape cartridge has tape wrapped convolutedly in opposite directions around hubs and guide pins to guide the tape past the tape drive read-write head. An elastic belt wraps pan-way around the tape packs and the hubs, as well as around the corner rollers and a drive roller. The belt is moved by a drive through frictional rotation of a drive puck by a motor. Other examples include a cartridge with a pivoting roller yoke as described in U.S. Pat. No. 5,573,195.

SUMMARY OF THE INVENTION

In the designing of such cartridges, many criteria are utilized to create a tape cartridge. These criteria include having good pack formation to drive air out between tape layers, low power consumption, a low impression in the tape left at the belt edges, nip point stability, and independent nip force from the belt tension and good start/stop performance. The present invention addresses the problems found in the prior art devices and provides for a tape cartridge which addresses the criteria set forth above.

According to the present invention, a data storage cartridge includes a base member and a yoke. A connection is provided between the yoke and the base member wherein the yoke has two degrees of motion relative to the base. A first degree of motion being linear and a second degree of motion being rotational. First and second hubs are mounted for rotation on the yoke, wherein tape is wound in opposite directions about the hubs to form two tape packs. A drive roller is mounted for rotation on the base member. The drive roller is positioned between the hubs. A first idler roller is mounted for rotation on the yoke and an elastic belt is stretched around the drive roller and first idler roller and engages the tape packs. In a preferred embodiment, the connection has a sliding mechanism and a rotating mechanism.

In another embodiment, the invention is a data storage cartridge having a base member. A yoke has a cavity formed therein. A support is operatively connected to the base. The support is positioned in the cavity wherein the yoke has two degrees of motion relative to the base. First and second hubs are mounted for rotation on the yoke, wherein tape is wound in opposite directions around the hubs to form two tape packs. A drive roller is mounted for rotation on the base member, the drive roller positioned between the hubs. A first idler roller is mounted for rotation on the yoke and an elastic belt is stretched around the drive roller and first idler roller and engages the tape packs. In a preferred embodiment, the cavity is an elongate slot sized and configured to allow linear movement and rotational movement of the yoke around the support.

DETAILED DESCRIPTION OF THE PREFERRED EMBODIMENT

Figure 1:
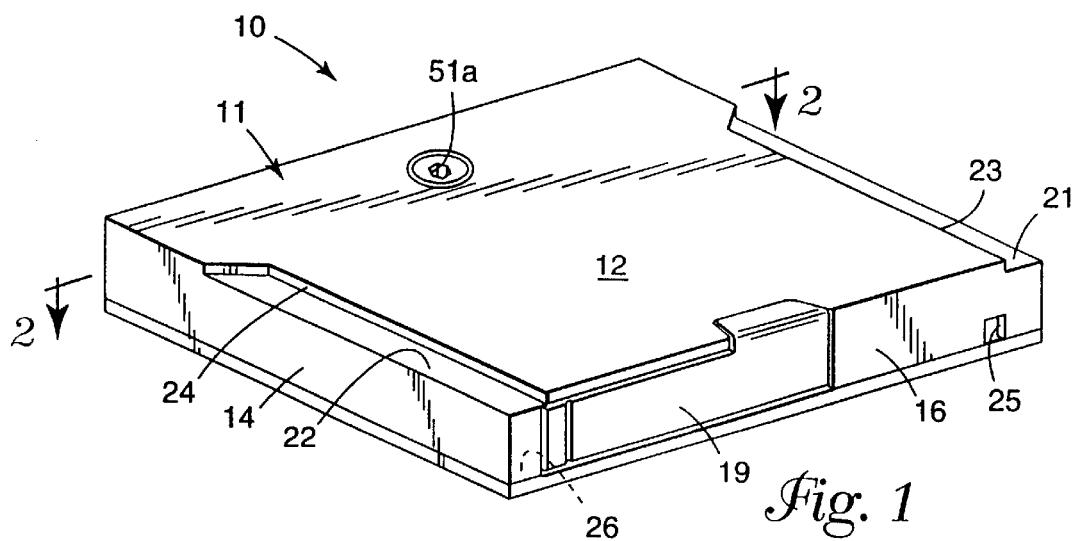
FIG. 1 is a perspective view of the data cartridge of the present invention.

Referring to the drawings, wherein like numerals represent like parts throughout the several views, there is generally disclosed 10 a cartridge. A perspective view of the housing 11 is shown in FIG. 1. The housing 11 may take on any suitable form. The housing may have the general construction of a mini cartridge or one of the several embodiments shown in U.S. Pat. No. 5,779,172. Modifications which would need to be made to these cartridges would include the centering of a media access opening and a provision for providing a different drive opening, both of which will be described in more detail hereafter. However, it will be appreciated by one skilled in the art that any suitable housing may be used and the housing 11 may be suitably modified to conform to the equipment utilizing the cartridge 10. A top 12, bottom 13, first side 14, second side 15, front 16 and back 17 are all operatively connected, by means well known in the art, to form a generally rectangular shaped housing 11. The housing 11 has a media access opening 18. A pivoting door 19 is positioned over the media access opening 18, when the cartridge 10 is not inside a drive 20. The housing 11 has interior sides 21 and 22 on support shoulders 23 and 24. First and second reference points 25 and 26 are utilized along with a third reference point (not shown) for positioning the cartridge 10 in the drive 20. The third reference point may be at any suitable point such as in the middle of the bottom 13. Again, the housing 11, described thus far, may be any suitable housing such as that shown in U.S. Pat. No. 5,779,172 or other similar housing. One skilled in the art would recognize that any suitable housing may be used for the specific drive 20 that is being utilized by the cartridge 10. The housing 11 is used to house the yoke and drive assemblies to be described in more detail hereafter.

Figure 5:
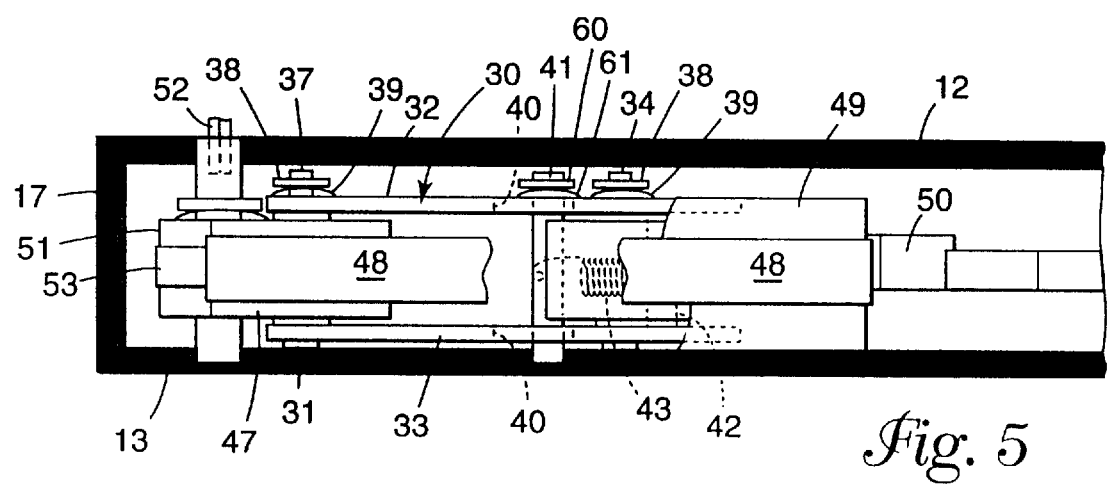
FIG. 5 is a cross-sectional view of the data cartridge shown in FIG. 2 taken generally along the lines 5—5.

A yoke or base plate 30 is in the general shape of a trapezoid and is positioned on top of the bottom 13. The yoke 30 rests on a plurality of bushings 31. The bushings 31 allow the yoke 30 to move relative to the bottom 13. The yoke 30 has an upper plate 32 and a lower plate 33. The plates 32 and 33 are connected by pins or shafts 34 through 37. The plates 32 and 33 are in the general shape of a trapezoid and are secured proximate their four corners by the shafts 34 through 37. The shafts 34 through 37 have their bottom ends secured to the lower plate 33 by suitable means such as a press fit. The upper ends of the shafts 34 through 37 extend through an opening or aperture in the upper plate 32. The top of the shafts 34 through 37 are then secured by a snap ring 38 and curved washer 39, as shown in FIG. 5. The shafts could also be a press fit into the upper and lower plates. FIG. 5 shows the snap ring attachment of shafts 34 and 37, it being understood that shafts 35 and 36 are similarly connected. An elongate slot 40 is formed in each of the upper plate 32 and lower plate 33. The slots 40 are in alignment with each other. A cylindrical post or fixed pin 41 has one end secured by suitable means such as a press fit into the bottom 13. The pin 41 extends up through the slots 40. A snap ring 61 and curved washer 60 are mounted at the top end to urge the yoke 30 against the bottom 13. A connecting pin 42 extends between the upper plate 32 and lower plate 33 and is operatively connected at its ends to the plates 32 and 33 by suitable means such as a press fit. A spring 43 has a first end 43a secured to the connecting pin 42 and a second end 43b connected to the fixed pin 41. The spring 43 is positioned between the plates 32 and 33. The spring thereby provides a force which urges the connecting pin 42 toward the fixed pin 41. Since the connecting pin 42 is connected to the plates 32 and 33, the yoke 30 is similarly urged in the same direction. The yoke 30 is free to move in a linear direction along the length of the slot 40. Further, the yoke is free to rotate about the fixed pin 41 by forces which will be described in more detail hereafter. Idler rollers 44 and 45 are rotatably mounted on the shafts 34 and 35, respectively, and are positioned between the plates 32 and 33. Similarly, hubs 46 and 47 are rotatably mounted on the shafts 46 and 47, respectively, and are also positioned between the plates 32 and 33. A tape 48 has a first end 48a (the beginning of the tape) secured to the second hub 47. The second end of the tape 48b (the end of the tape) is secured to the hub 46. The tape extends around a tape guide 49 which brings the tape 48 in proximity to the reading head 50 of the drive 20.

A driver 51 is rotatably mounted between the top 12 and bottom 13. The cylindrical portion of the driver 51 has cylindrical drive shafts extending in each direction and are suitably mounting in the top 12 and bottom 13 with suitable bearings 54. An elongate cavity 51a is formed in the upper shaft of the driver 51 and is keyed. In FIG. 1, it is shown that the cavity is hexagonal shaped. This keyed shape is for receiving a drive shaft 52 which has a similar hexagonal shape so that torque may be transmitted from the drive shaft 52 to the drive 51. The drive shaft 52 is connected to a suitable device to impart rotational movement. It is understood any suitable connection or coupling of a drive motor shaft to the drive shaft 52 may be used to transmit torque. A drive belt 53 extends around the driver 51 and idler rollers 54 and 55. The drive belt 53 engages the tape packs and imparts rotational movement to the hubs 46 and 47 through the tape packs.

Figure 2:
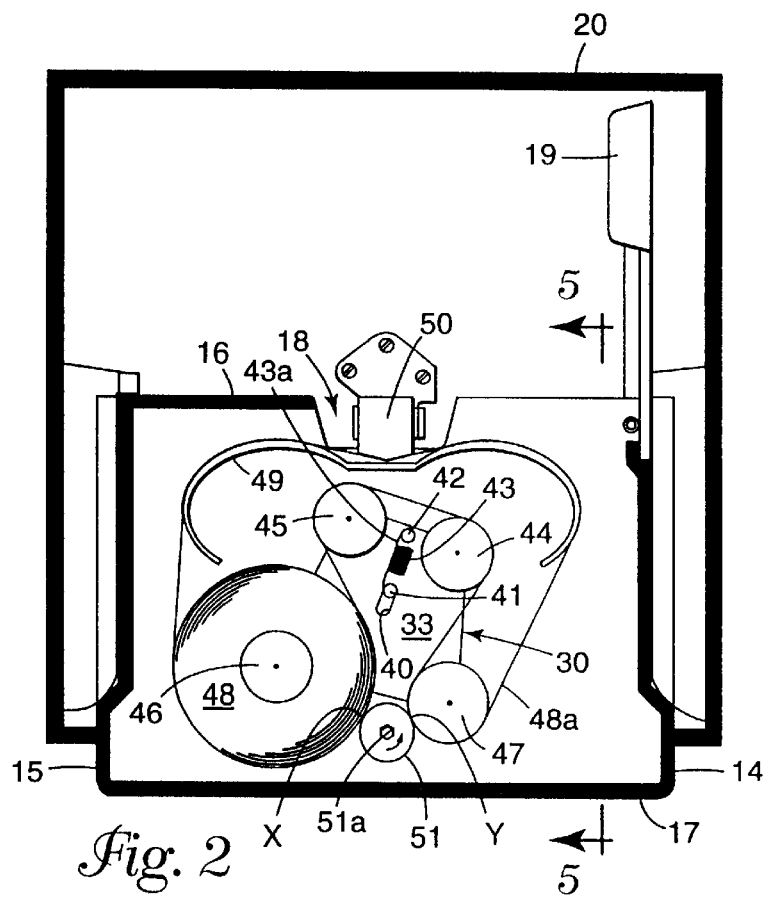
FIG. 2 is a cross-sectional view of the cartridge shown in FIG. 1 taken generally along the lines 2—2, showing the tape pack in a beginning of tape position.
Figure 3:
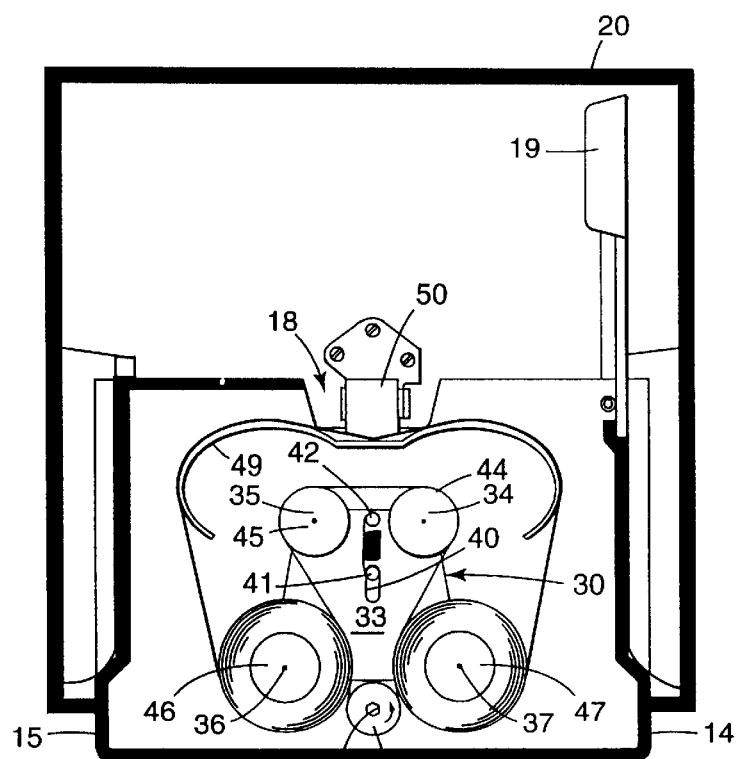
FIG. 3 is a cross-sectional view of the cartridge shown in FIG. 1 taken generally along the lines 2—2, showing the tape pack in a middle of tape position.

Assuming that the data cartridge 10 is at a beginning of tape position, the tape 48 is in a configuration as shown in FIG. 2. The spring 43 forces the yoke 30 and therefore the hubs 46 and 47 downward so that the tape packs engage the driver 51. Then, as the driver 51 is driven in a counterclockwise direction by the drive shaft 52, the tape is transferred from the hub 46 to the hub 47. At a position where approximately one-half of the tape 48 has been transferred, the two tape packs are in a position as shown in FIG. 3. Due to the change in geometry because of the smaller diameter of the tape pack around hub 46 and the larger tape pack around hub 47, the yoke 30 is moved upward and the slot 40 has moved relative to the fixed pin 41. In FIG. 2, slot 40 is positioned such that the fixed pin is near the top of the slot 40. Then, as shown in FIG. 3, the yoke 30 has moved upward and the pin 41 is in the lower portion of the slot 40. At the same time, the yoke 30 has pivoted around the fixed pin 40 and has moved in a counterclockwise direction.

Figure 4:
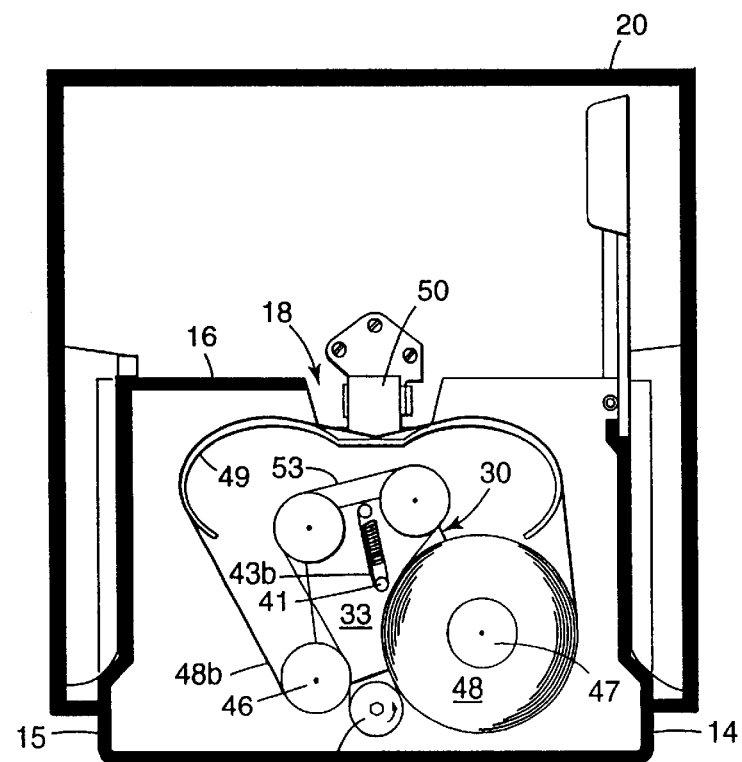
FIG. 4 is a cross-sectional view of the cartridge shown in FIG. 1 taken generally along the lines 2—2, showing the tape pack in an end of tape position.

FIG. 4 shows the tape 48 at the end of tape. Here, the yoke 30 has continued to rotate counterclockwise and slot 40 has moved such that the pin 41 is back at the top of the slot, and the same position as in FIG. 2, except for the rotation of the yoke 30.

While the specific geometry of the cartridge 10 will depend on a number of factors including the amount of tape, one construction which has been found suitable is as follows. The hub diameters 46 and 47 were 1.2 inches (3.048 cm) with a full pack diameter of 1.75 inches (4.445 cm). The tape used was a ½ inch (1.27 cm) wide 300 UIN total thickness smooth backside tape. The driver diameter was 0.5 inches (1.27 cm) and the spring tension force was approximately six pounds (2.722 kg). The polyurethane belt was made of tubular, installed thickness of 4 mils (0.1016 mm) and was 0.2 inches (0.508 cm) wide. The belt tension was 12 ounces (0.340 kg) and the tape tension 4 ounces (0.113 kg) from full pack to empty pack.

In another construction, when the tape packs are in the middle of the tape position, each pack has a diameter of 2.116 inches (5.375 cm) and the centers of the hubs are 2.40 inches (6.096 cm) apart. Each hub has a diameter of 1.12 inches (2.8448 cm) and the driver has a diameter of 0.75 inches (1.905 cm).

The present invention allows for a single point drive where the tape tension is controlled by the cartridge itself. Having the tension control within the cartridge which is provided by the spring tension and yoke combination, is a major advantage over other data cartridges. Further, the present invention provides for a nip which drives out air between the tape layers as the tape winds. A nip designated at point X is formed between the drive roller and the tape pack on the hub 46. A second nip point Y is formed between the drive roller 51 and the second tape pack around the hub 47. The nip drives out air between the layers in more effective manner than in the prior art cartridges. The nip is also formed with a stable driver 51. The driver 51 is stable as it is mounted between the top 12 and bottom 13. The driver is therefore stable and does not move as in some prior art designs. The driver 51 is stationary and the pack around the hubs 46 and 47 move so there is no problem with angular stability of the driver 51. An additional feature of the present invention is that the nip force is independent from the belt tension. The nip force may be adjusted independent of the belt tension by choosing an appropriate tension of the spring 43.

Tape tension is created by a combination of the drive belt 53 peripheral speed difference at each tape pack and the compliance of the belt. As shown in FIG. 4, the driver has a smaller radius than the large tape pack. The diameter of the tape pack around the hub 47 is larger than the driver roller but smaller than that of the tape pack around hub 46. Therefore, the belt is moving faster proximate the hub 46 than the hub 47. This creates a speed differential which causes tension in the tape at the head 50. In other versions of data cartridges, the tape tension is created by dragging the corner rollers which is dissipated as heat. Therefore, the present invention provides for a lower power consumption. In the example previously given, the power consumption was four watts of power to generate 4 ounces (0.113 kg) of tape tension on ½ inch (1.27 cm) tape at 120 inches (3.048 cm) per second.

Another feature of the present invention is the improved start/stop for performance. In prior art data cartridges, when the drive roller is stopped, suddenly the full tape pack can continue to move as it stretches the belt segment between the drive roller and the tape pack. In the present invention, the pack inertia is directly coupled to the drive motor through the nip points so that the drive motor (connected to the drive shaft 52) becomes an inertial break for the tape pack when it is brought to a stop.

The yoke 30 has been described as having an upper plate 32 and a lower plate 33. It is of course appreciated that the yoke 30 may be constructed from only one plate. Further, it is within the scope of the present invention that the connection which allows the two degrees of freedom of the yoke 30 may be other than the slot 40 and fixed pin 41. The slot 40 and fixed pin 41 provide an easy-to-manufacture and economical connection which allows for two degrees of movement. That is, the yoke is free to move along the linear length of the slot 40 and further the yoke is free to rotate around the fixed pin 41. The fixed pin is sized to be slightly less than the width of the slot 40 thereby allowing the yoke 30 to move linearly along the pin and also allow rotation. Other embodiments would be capable of providing the same two degrees of movement. For example, if the yoke was only made of one plate, the slot would not have to extend all of the way through the plate and a cavity could be formed. The cavity could have an elongate indentation to allow the linear movement and the pin would still fit within the cavity and allow for rotation. Alternately, instead of a cavity, two rails could be placed on the bottom of the yoke to form the equivalent of a slot and a pin could move with two degrees of freedom between the rails. It is understood that other mechanical connections could also be used to allow for the linear and rotational movement for the yoke 30.

I claim:

1. A data storage cartridge comprising:
   a) a base member;
   b) a yoke having a cavity formed therein;
   c) a support operatively connected to the base, the support positioned in the cavity wherein the yoke has two degrees of motion relative to the base;
   d) first and second hubs mounted for rotation on the yoke, wherein tape is wound in opposite directions around the hubs to form two tape packs;
   e) a drive roller mounted for rotation on the base member, the drive roller positioned between the hubs;
   f) a first idler roller mounted for rotation on the yoke; and
   g) an elastic belt stretched around the drive roller and first idler roller and engaging the tape packs.

2. The cartridge of claim 1, wherein the cavity is an elongate slot sized and configured to allow rotational movement of the yoke around the support.

3. The cartridge of claim 1, further comprising a spring having a first end operatively connected to the support and a second end operatively connected to the yoke, wherein the yoke is urged toward the drive roller.

4. The cartridge of claim 1, further comprising a second idler roller mounted for rotation on the yoke, the elastic belt stretched around the second idler also.

5. A data storage cartridge, comprising:
   a) a base member;
   b) a yoke;
   c) a connection between the yoke and base member wherein the yoke has two degrees of motion relative to the base, a first degree of motion being linear and a second degree being rotational;
   d) first and second hubs mounted for rotation on the yoke, wherein tape is wound in opposite directions around the hubs to form two tape packs;
   e) a drive roller mounted for rotation on the base member the drive roller positioned between the hubs;
   f) a first idler roller mounted for rotation on the yoke; and
   g) an elastic belt stretched around the drive roller and first idler roller and engaging the tape packs.

6. The cartridge of claim 5, wherein the connection has a sliding mechanism and a rotating mechanism.

7. The cartridge of claim 5, wherein the connection is a cavity formed in the yoke and a support operatively connected to the base at one end and extending into the cavity at a second end.

8. The cartridge of claim 5, wherein the cavity is an elongate slot sized and configured to allow rotational movement of the yoke around the support.

9. The cartridge of claim 5, further comprising a spring having a first end operatively connected to the base and a second end operatively connected to the yoke, wherein the yoke is urged toward the drive roller.

10. The cartridge of claim 5, further comprising a second idler roller mounted for rotation on the yoke, the elastic belt stretched around the second idler also.

11. A data storage cartridge comprising:
    a) a housing having a media access opening and a drive access opening formed therein the housing having a base member;
    b) a yoke;
    c) a connection between the yoke and base member wherein the yoke has two degrees of motion relative to the base, a first degree of motion being linear and a second degree being rotational;
    d) first and second hubs mounted for rotation on the yoke, wherein tape is wound in opposite directions around the hubs to form two tape packs;
    e) a drive roller mounted for rotation on the base member the drive roller positioned between the hubs;
    f) a first idler roller mounted for rotation on the yoke; and
    g) an elastic belt stretched around the drive roller and first idler roller and engaging the tape packs.

12. The cartridge of claim 11, wherein the connection has a sliding mechanism and a rotating mechanism.

13. The cartridge of claim 12, wherein the connection is a cavity formed in the yoke and a support operatively connected to the base at one end and extending into the cavity at a second end.

14. The cartridge of claim 13, wherein the cavity is an elongate slot sized and configured to allow rotational movement of the yoke around the support.

15. The cartridge of claim 14, further comprising a spring having a first end operatively connected to the base and a second end operatively connected to the yoke, wherein the yoke is urged toward the drive roller.

16. The cartridge of claim 15, further comprising a second idler roller mounted for rotation on the yoke, the elastic belt stretched around the second idler also.

* * * * *